(No Model.)
C. G. TALLY.
STEAM TRAP.
No. 594,184.   Patented Nov. 23, 1897.
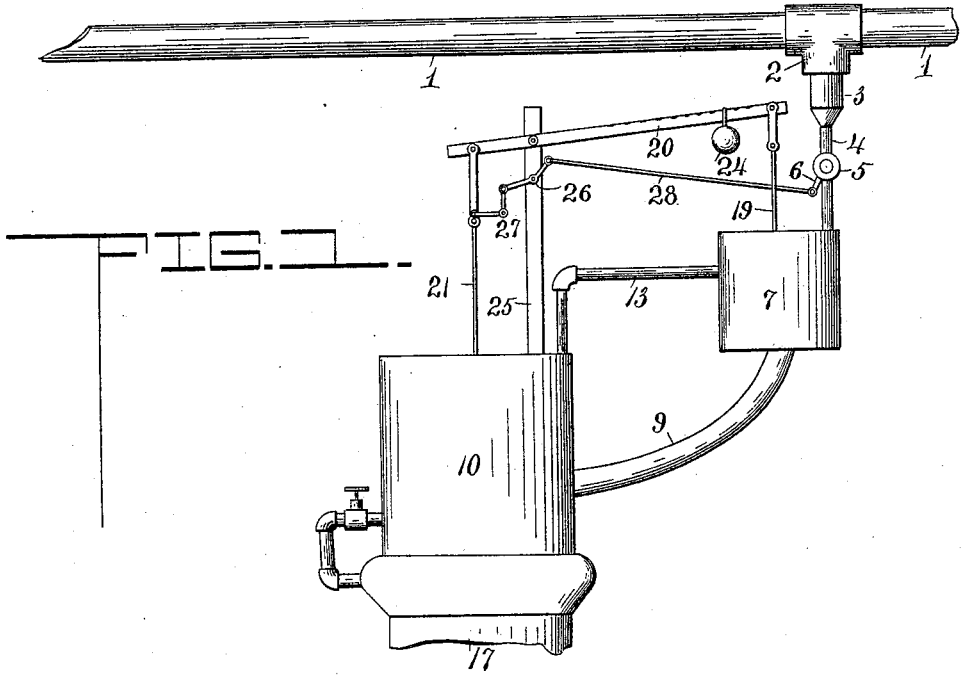
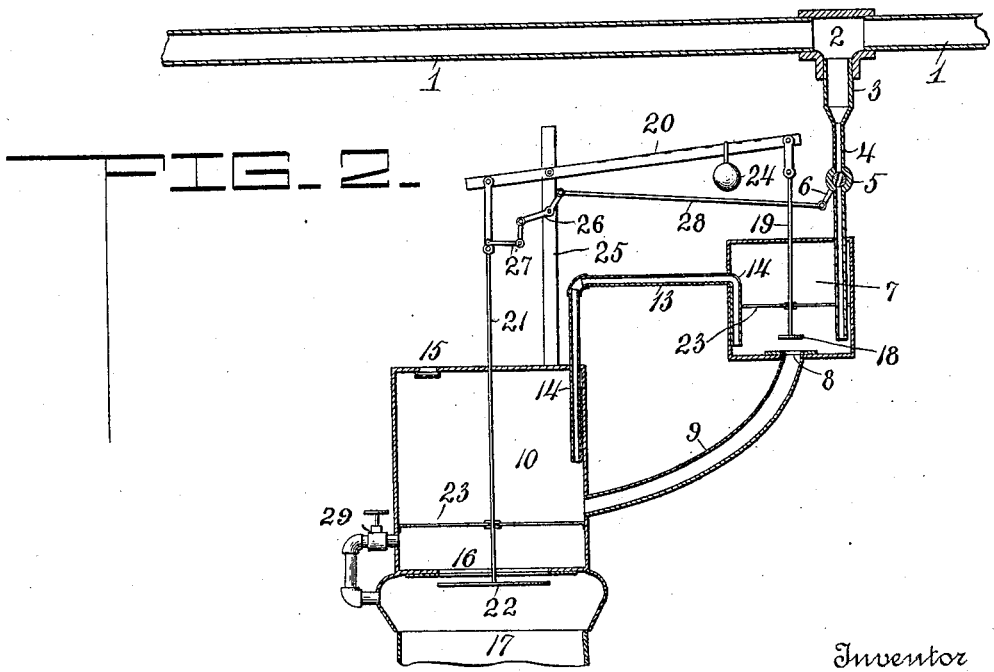
Witnesses
W. E. Allen
Victor J. Evans
Inventor
Colonel Gentry Tally.
By John Wedderburn.
Attorney

UNITED STATES PATENT OFFICE.

COLONEL GENTRY TALLY, OF CINCINNATI, OHIO.

STEAM-TRAP.

SPECIFICATION forming part of Letters Patent No. 594,184, dated November 23, 1897.

Application filed April 26, 1897. Serial No. 633,949. (No model.)

*To all whom it may concern:*

Be it known that I, COLONEL GENTRY TALLY, a citizen of the United States, and a resident of Cincinnati, in the county of Hamilton and State of Ohio, have invented certain new and useful Improvements in Steam-Traps; and I do hereby declare the following to be a full, clear, and exact description of the invention, such as will enable others skilled in the art to which it appertains to make and use the same.

This invention relates to improvements in steam-traps for the purpose of discharging water of condensation from steam-engines or steam-pipes, the parts of the apparatus being so constructed and arranged to operate automatically by the weight of the collected water which overflows from an upper tank into a lower one, the said lower tank having a valve which is operated by the weight of the water and is connected to an outlet-valve in the other tank for moving the same from its seat, the intervening mechanism being connected to the supply-valve which controls the admission of steam to the trap.

With the above ends in view the invention consists in arranging two tanks at different elevations and providing them with valves which are so connected to each other and arranged that the water which overflows from the upper tank will operate the valves by its weight upon the valve in the lower tank.

The invention further consists in operating the inlet-valve from the mechanism that is operated upon by the weight of the collected water.

In the following specification I have entered into a detailed description of the particular construction of my invention, reference being had to the accompanying drawings, and to numerals which designate the different parts, and what I consider to be the novel features are specifically set forth in the claims.

In the drawings forming part of this specification, Figure 1 is a side elevation showing the general construction of a steam-trap constructed in accordance with my invention. Fig. 2 is a similar view, the tank and pipe connections being in section.

Referring to the drawings by numerals, 1 designates the steam-pipe, which is provided with an interposed T-coupling 2, having a reduction-pipe 3, which connects with a smaller pipe 4. This small pipe is provided with a valve 5, that controls the admission of steam to the trap, and is provided with a crank-arm 6, that is automatically operated, as hereinafter described, and the lower end of the said pipe 4 extends through the top of a tank 7, terminating a short distance from the bottom thereof adjoining the side wall.

In the center of the bottom of the tank 7 is an opening 8, surrounding which is a valve-seat, and this opening communicates with a discharge-pipe 9, that extends to and opens into a second tank 10, located below the first-mentioned tank. The tanks are connected to each other by a pipe 13, that extends upward from near the bottom of the tank 7, through the upper part of the same, and down through the top of the tank 10, terminating near the bottom thereof adjoining the side wall, the said pipe forming an overflow which carries the water from the upper tank to the lower one when the level in the first-mentioned tank reaches the horizontal portion of the pipe.

In order to maintain an equal pressure in the upper part of both tanks 7 and 10, the overflow-pipe 13 is provided with the vents 14, another vent-opening 15 being located in the top of the tank 10 and having a clap-valve which closes the same and opens into the tank. The bottom of the tank 10 is also provided with a discharge-opening 16 of considerable greater diameter than the discharge-opening in the upper tank, the under side of the bottom having a valve-seat surrounding the opening, and this opening 16 communicates with the water-discharge or waste pipe 17.

18 designates a disk valve which covers the discharge-opening 8 in the tank 7 and is provided with a valve-rod 19, that extends through the top of the tank and is connected to the long end of a lever 20, centrally fulcrumed to a suitable support. The other or short end of the lever 20 is connected to the rod 21 of a disk valve 22, which closes the opening 16 in the bottom of the tank 10 and opens downward away from said opening or in opposition to the movement of the valve in the tank 7. The valve-rods are guided by cross-bars 23, located within the tanks, to insure their proper engagement with the seats. By the arrangement of valves and manner of connecting the same it will be understood that the downward movement of the valve 22 to uncover the opening 16 will lift the valve 18 in the other tank, and as the larger valve is connected to the short end of the lever it will require but a short or slight movement to greatly elevate the other or smaller valve, and in order to regulate the amount of pressure required to operate the lever the same is provided with an adjustable weight 24, engaging notches in the upper edge of the longer end of said lever.

Upon the upright end 25, which extends from the tank 10 and supports the operating-lever 20, is pivoted a bell-crank lever 26, one member of which is connected to a second bell-crank lever 27, connected to the valve-rod 21, while the other member of the bell-crank lever 26 is connected by a rod 28 to the crank-arm 6 of the valve which controls the supply of steam to the trap.

From the foregoing description, in connection with the accompanying drawings, the construction and operation of my improved steam-trap will be readily understood, for supposing the valves in the tanks to be closed the water of condensation from the steam-pipe will enter the tank 7, and when it reaches a level with the horizontal portion of the connecting or overflow pipe 13 the said pipe will conduct the water into the lower or larger tank 10, and when a sufficient quantity is collected in this tank to operate or lower the valve 22 the said valve will trip the valve 18 in the upper tank and discharge the water therefrom through the pipe 9 into the tank 10, and when the weight of water upon the valve 22 is not sufficient to overcome the weight 24 and valve 8 it will be returned to its seat automatically and close both valves. During this operation the bell-crank levers will be manipulated to cut off the valve in the inlet-pipe, opening said valve when the valves in the tanks are closed or seated. Thus it will be seen that the water which is collected in the tank 7 will be discharged when it has overflowed sufficiently to operate the valve 22 in the larger tank. The vent-openings 14 maintain or equalize the pressure of air in the upper part of the tanks, and the air-valve 15 supplies the air, but prevents back pressure. The tank 10 is provided with a draw-off cock 29, which discharges into the waste-pipe 17. It will be understood, of course, that the lower or larger cylinder may be provided with the ordinary glass tube or gage, which will indicate the level of the water therein, and the large valve may be provided with a stop to limit the extent of its movement away from its seat.

Having thus described my invention, what I claim as new, and desire to secure by Letters Patent, is—

1. A steam-trap comprising tanks arranged at different elevations, valves located in the bottom of said tanks and opening in opposite directions, and means connecting said valves for operating them in unison, the steam-pipe discharging into the upper tank, a pipe connecting the upper tank with the lower tank, and an overflow-pipe connecting said tanks, substantially as shown and for the purpose set forth.

2. In a steam-trap, the combination with the tanks located at different elevations, a pipe and overflow-pipe connecting the upper tank with the lower tank, a valve in the upper tank, and a valve in the lower tank closing an opening therein leading to the waste-pipe, the latter valve opening downward, and means for connecting the valves to each other, the steam-pipe discharging into the upper tank, substantially as shown and for the purpose set forth.

3. In a steam-trap, the combination with the tanks located at different elevations and connected to each other by a pipe, of a valve closing the upper end of said pipe, and a valve in the bottom of the lower tank opening downward, together with means connecting the valve to operate them in unison, a valve in the supply-pipe which enters the upper tank, and devices for manipulating the valve in the supply-pipe when the valves in the tanks are operated, substantially as shown and for the purpose set forth.

4. In a steam-trap, the combination with the tanks located one above the other and connected by a discharge-pipe which communicates with the upper tank through an opening in the bottom thereof, a valve covering said opening, a second valve covering an opening in the lower tank and opening downward therefrom, an overflow-pipe connecting the upper and lower tanks, and a lever connecting the valves in the two tanks, together with the valve in the supply-pipe, and bell-crank levers connecting said valve with the mechanism that operates the valves in the tanks, substantially as shown and for the purpose set forth.

In testimony whereof I have signed this specification in the presence of two subscribing witnesses.

COLONEL GENTRY TALLY.

Witnesses:
 CHARLES BUCKLEY,
 HENRY J. SNYDER.